(12) United States Patent
Martin

(10) Patent No.: US 10,601,606 B2
(45) Date of Patent: Mar. 24, 2020

(54) COMMUNICATIONS ON VEHICLE DATA BUSES

(71) Applicant: JAGUAR LAND ROVER LIMITED, Coventry, Warwickshire (GB)

(72) Inventor: Shaun Martin, Coventry (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 0 days.

(21) Appl. No.: 16/083,149

(22) PCT Filed: Mar. 30, 2017

(86) PCT No.: PCT/EP2017/057588
§ 371 (c)(1),
(2) Date: Sep. 7, 2018

(87) PCT Pub. No.: WO2017/167907
PCT Pub. Date: Oct. 5, 2017

(65) Prior Publication Data
US 2019/0103988 A1    Apr. 4, 2019

(30) Foreign Application Priority Data
Mar. 31, 2016 (GB) .................................. 1605388.6

(51) Int. Cl.
*H04L 12/40* (2006.01)
*H04L 12/403* (2006.01)

(52) U.S. Cl.
CPC ........ *H04L 12/40013* (2013.01); *H04L 12/40* (2013.01); *H04L 12/403* (2013.01);
(Continued)

(58) Field of Classification Search
CPC ......... H04L 12/40039; H04L 12/40013; H04L 12/403; H04L 2012/40215; H04L 2012/40273
See application file for complete search history.

(56) References Cited

U.S. PATENT DOCUMENTS

| 9,112,721 B2* | 8/2015 | Behrens ................. H04L 12/12 |
| 2006/0013237 A1* | 1/2006 | Furuta .................... H04L 12/12 370/401 |

(Continued)

FOREIGN PATENT DOCUMENTS

EP    2408141 A1    1/2012

OTHER PUBLICATIONS

Yi, Chae Hong; "Power Saving using Partial Networking in Automotive System"; Proceeding of the 2015 IEEE International Conference on Information and Automation; Lijiang, China; Aug. 2015. (Year: 2015).*

(Continued)

*Primary Examiner* — Glenn A. Auve
(74) *Attorney, Agent, or Firm* — Miller Nash Graham & Dunn LLP

(57) ABSTRACT

An apparatus 101, a communications network 301, a vehicle 305 and a method are disclosed. The apparatus and method are for providing communications between buses 303A, 303B, 303C 303D within the vehicle 305. The apparatus 101, which preferably is a central gateway, comprises a control means 102, storage means 104 for storing data and communication means 105 for transmitting and receiving signals on the plurality of data buses 303A, 303B, 303C 303D. The control means 102 is configured to determine at least one selected bus 303A, 303B, 303C 303D in respect of a received partial networking request and in dependence on a set of conditions for partial networking being met, cause network management signals to be provided to the at least one selected bus 303A, 303B, 303C 303D for maintaining nodes 201, 302 on the at least one selected bus in an awake state while allowing node(s) on at least one other bus to enter a sleep state. In the present example, three of the buses (Continued)

303A, 303B and 303C are CAN buses and are connected to ports 107 of a first transceiver 106A, while one bus 303D is a FlexRay bus and it is connected to a port 107 of a second transceiver 106B. The apparatus 101 differs from conventional central gateways in that, it is configured to receive partial networking requests and provide communication in respect of those requests. If the apparatus 101 receives a network management message and a partial networking request from the same node 201, 302, it may allow some buses (that are not required for the communication requested by the partial networking request) to return to the sleep state, while selected buses that are required for the partial networking communication are maintained in an awake state. In this way, the apparatus 101 may enable communication between nodes 201, 302 on different buses, while allowing nodes 201, 302 on buses that are not required for the communication to enter a sleep state. A node 201 may perform several different functions which only require partial networking, and the partial networking request may comprise a message that identifies the function for which communication is required, to enable the gateway 101 to maintain the required buses in an awake state.

19 Claims, 11 Drawing Sheets

(52) U.S. Cl.
CPC ................. *H04L 12/40039* (2013.01); *H04L 2012/40215* (2013.01); *H04L 2012/40273* (2013.01)

(56) References Cited

U.S. PATENT DOCUMENTS

| | | | |
|---|---|---|---|
| 2012/0042186 A1* | 2/2012 | Rott | H04L 12/12 713/323 |
| 2012/0257655 A1* | 10/2012 | Muth | H04L 12/12 375/219 |
| 2012/0271975 A1* | 10/2012 | Elend | H04L 12/12 710/105 |
| 2013/0250804 A1* | 9/2013 | Hwang | H04L 41/12 370/254 |
| 2013/0322449 A1* | 12/2013 | Hwang | H04L 45/50 370/392 |
| 2014/0241370 A1* | 8/2014 | Itou | H04L 45/44 370/396 |
| 2014/0247831 A1 | 9/2014 | Messner | |
| 2014/0350772 A1* | 11/2014 | Saito | G07C 5/0808 701/29.1 |
| 2015/0095532 A1* | 4/2015 | Muth | G06F 13/4072 710/105 |
| 2015/0106540 A1 | 4/2015 | Hoffmann et al. | |
| 2015/0112510 A1* | 4/2015 | Tokunaga | B60R 16/03 701/1 |
| 2015/0192983 A1 | 7/2015 | Rennig | |
| 2015/0298626 A1* | 10/2015 | Okuyama | B60W 50/045 701/1 |
| 2018/0309590 A1* | 10/2018 | Beckmann | H04L 12/12 |

OTHER PUBLICATIONS

Butzkamm, Cornelius and Bollati, David; "Partial Networking for CAN bus systems: Any saved gram CO2/km is essential to meet stricter EU regulations"; CAN in Automation; International CAN Conference (iCC) 2012. (Year: 2012).*
Search and Examination Report, GB1605388.6, dated Nov. 22, 2016, 6 pages.
International Search Report and Written Opinion, PCT/EP2017/057588, 14 pages.

* cited by examiner

| SOURCE NODE ID | PN REQUEST FUNCTION | REQUIRED BUS |
| --- | --- | --- |
| NODE #1 | FUNCTION #1 | BUS #1 AND BUS #2 |
| NODE #1 | FUNCTION #2 | BUS #1 |
| NODE #1 | FUNCTION #3 | BUS #2 |
| NODE #2 | FUNCTION #4 | BUS #1 |

Fig. 11

COMMUNICATIONS ON VEHICLE DATA BUSES

CROSS-REFERENCE TO RELATED APPLICATIONS

This application is a 371 of International Application No. PCT/EP2017/057588, filed Mar. 30, 2017, which claims priority to GB Patent Application 1605388.6, filed Mar. 31, 2016, the contents of both of which are incorporated by reference herein in their entirety.

TECHNICAL FIELD

The present disclosure relates to communications on data buses. In particular, but not exclusively it relates to communications on data buses in a vehicle.

Aspects of the invention relate to an apparatus, an electronic control unit, a communication network, a vehicle, a method, a computer program, and a non-transitory computer readable media.

BACKGROUND

Vehicles may include several data buses which may be interconnected by a central gateway and which provide communication between electronic control units (ECUs) of the vehicle. For functions carried out by the ECUs communication over the data buses may be required. If all ECUs attached to the buses are required to be in an awake state for the purposes of the communication, energy is used by each ECU, even when the communication is not relevant to them. Therefore, energy is used by maintaining ECUs in an awake state when they are not required.

It is an aim of the present invention to provide a solution that saves energy.

SUMMARY OF THE INVENTION

Aspects and embodiments of the invention provide an apparatus, an electronic control unit, a communication network, a vehicle, a method, a computer program and a non-transitory computer readable media as claimed in the appended claims.

According to an aspect of the invention there is provided an apparatus for providing communications between buses within a vehicle, the apparatus comprising a control means, storage means for storing data and communication means for transmitting and receiving signals on a plurality of data buses, wherein the control means is configured to: determine at least one selected bus in respect of a received partial networking request; and in dependence on a set of conditions for partial networking being met, cause network management signals to be provided to the at least one selected bus for maintaining nodes on the at least one selected bus in an awake state while allowing node(s) on at least one other bus to enter a sleep state.

The control means may comprise a controller, optionally having at least one processor, for providing network management. The storage means may comprise at least one memory device, and the communication means may comprise at least one transceiver for communicating over one or more data buses.

This provides the advantage that communication may be provided between nodes on a connected network while energy is saved by allowing the nodes on the at least one other bus to enter a sleep state. That is, the nodes on the at least one other bus are allowed to enter a sleep state in which the main processor of a node is allowed to enter a low energy mode while the transceiver does not transmit or receive data. In this sleep state the transceiver is able to detect activity on the bus and, in response to detecting activity on the bus, initiate a wakeup to wake the main processor and start transmitting and/or receiving data.

In an embodiment, the control means is configured to: determine if a network management message has been received without a partial networking request; and in dependence upon receiving a network management message without a partial networking request, cause network management signals to be provided for maintaining node(s) on all connected buses in an awake state. This allows the apparatus to maintain all nodes in an awake state when required, for example for safety reasons.

In an embodiment, the control means is configured to: determine a set of selected buses that are required to provide requested partial networking for each one of a plurality of partial networking requests; and perform a logical OR on the sets of selected buses to determine the at least one selected bus. This allows the apparatus to minimize the number of buses that are maintained in an awake state when several functions are to be performed that require communication over a network, while continuing to provide a communication means to the buses that are required.

In an embodiment, the set of conditions comprises a plurality of conditions, and the control means is configured to determine if all of the conditions are met.

In some embodiments, the condition(s) for partial networking comprise(s) the absence of a current request for networking without partial networking. This ensures that for functions where it is necessary to maintain all nodes in an awake state, if communication in respect of such a function is required then all nodes are maintained in an awake state.

In some embodiments, the condition(s) for partial networking comprises a vehicle ignition switch being in an off state. This ensures that all nodes are in an awake state when the vehicle of the engine is running or is about to be run.

In some embodiments, the control means is configured to determine if a partial networking request received from a node is valid by determining if a network management message has also been received from the same node. This allows a partial networking request that may have been received in error to be disregarded.

In some embodiments, the control means is configured to: provide network management signals to maintain in an awake state for a predefined period of time nodes on the at least one selected bus and on said at least one other bus; and subsequently allowing node(s) on said at least one other bus to enter a sleep state, while continuing to provide network management signals to the at least one selected bus for maintaining nodes on the at least one selected bus in an awake state. By firstly maintaining both the nodes on the selected bus and nodes on the at least one other bus, it allows all of these nodes to update stored data before shutdown, rather than selective nodes and select data. It also means the network of the vehicle still wakes up and shutdowns in the same way.

In some embodiments, the control means is configured to: receive a partial networking request identifying a function; and determine the at least one selected bus by retrieving from the storage means at least one bus identifier corresponding to the function. This enables the apparatus to easily identify buses required for the partial networking communication without further input being required by the source of the request.

In some embodiments, the control means is configured to: receive a first partial networking request identifying a first function and a second partial networking request identifying a second function; retrieve at least one first bus identifier corresponding to the first function and retrieve at least one second bus identifier corresponding to the second function; and perform a logical OR on the first and second bus identifiers to determine the at least one selected bus for the requested partial networking. This allows the apparatus to minimize the number of buses that are maintained in an awake state when several functions are to be performed that require communication over a network.

In some embodiments, the control means is configured to: monitor changes in status of requests for networking; and in dependence upon a change in status of requests for networking, provide network management signals to all buses for putting nodes in an awake state. This ensures that the nodes on the network are quickly brought to an awake state to act in accordance with the change of requests for networking.

In some embodiments, the control means comprises a controller configured to provide network management, the storage means comprises at least one memory device means, such as a memory device, and the communication means comprises at least one transceiver configured to communicate over a plurality of data buses.

In some embodiments, the apparatus comprises a central gateway.

According to an aspect of the invention there is provided an electronic control unit for a vehicle, the electronic control unit comprising a control means for controlling a system in a vehicle and a communication means for communicating over a bus, wherein the electronic control unit is configured to: determine that a first function to be performed is performable with partial networking; in dependence on the first function being performable with partial networking, transmit a network management message and transmit a partial networking request.

The control means may comprise a controller, optionally having at least one processor. The communication means may comprise at least one transceiver for communicating over one or more data buses.

This provides the advantage that the electronic control unit is able to obtain communication via a network while nodes on at least one bus are allowed to return to a sleep state during the communication process, thereby saving energy.

In some embodiments, the partial networking request comprises a message that identifies the first function. This allows a receiving gateway to identify the buses necessary for the communication for the first function.

In some embodiments, the electronic control unit is configured to: determine whether both the first function to be performed and a second function to be performed are performable with partial networking; and in dependence on both the first function and the second function being performable with partial networking, transmit one or more partial networking requests identifying the first function and the second function.

In some embodiments, the electronic control unit is configured to: determine that another function to be performed is not performable with partial networking; and in dependence of the other function not being performable with partial networking, transmit a network management message without a partial networking request, to require all buses to be maintained in an awake state. This minimizes the communication from the electronic control unit when partial networking is not possible and may reduce subsequent processing of a gateway receiving the network management message.

In some embodiments, the electronic control unit is an engine control unit or a powertrain control unit and the first function comprises communication relating to battery charging. This has the advantage of saving energy during the process of battery charging. Therefore the invention is particularly advantageous for vehicles in which at least a portion of their motive energy is electrical energy stored in a battery. For example, it is particularly advantageous in electrical vehicles and hybrid electric vehicles.

In some embodiments, the control means comprises a controller for controlling a system within a vehicle and the communication means comprises a transceiver configured to communicate over a bus.

According to an aspect of the invention there is provided a communication network for a vehicle comprising an apparatus as described in a foregoing aspect of the invention operatively connected to a plurality of nodes via a plurality of buses.

In some embodiments, at least one of the nodes is an electronic control unit as claimed in the claims.

According to an aspect of the invention there is provided a vehicle having a communication network as claimed in the claims.

According to an aspect of the invention there is provided a method of communication over a plurality of buses within a vehicle, the method comprising: determining at least one selected bus in respect of a received partial networking request; and in dependence on a set of conditions for partial networking being met, providing a network management signal to the at least one selected bus for maintaining nodes on the at least one selected bus in an awake state while allowing node(s) on at least one other bus to enter a sleep state.

In some embodiments, the method comprises: determining if a request for network management without partial networking has been received; and in dependence upon receiving a request for network management without partial networking, maintaining nodes on the at least one other bus in an awake state. In embodiments, all buses are maintained in an awake state in dependence of receiving a request for network management without partial networking.

In some embodiments, the method comprises: determining a first set of selected buses that are required to provide requested partial networking for a first partial networking request; determining a second set of selected buses that are required to provide requested partial networking for a second partial networking request; and performing a logical OR on the first set and second set to determine the at least one selected bus to which network management signals are provided.

In some embodiments, the set of conditions for partial networking comprises a plurality of conditions and one of the conditions comprises the vehicle ignition switch being in an off state.

In some embodiments, the method comprises: providing network management signals to maintain nodes on the at least one selected bus and said at least one other bus in an awake state for a predefined period of time; and subsequently allowing nodes on said at least one other bus to enter a sleep state.

In some embodiments, the method comprises: receiving a partial networking request identifying a function; and retrieving stored bus identifiers corresponding to the function identified in the partial networking request to determine the at least one selected bus.

In some embodiments, the method comprises: determining a set of selected buses that are required to provide a requested partial networking for each one of a plurality of partial networking requests; and perform a logical OR on the sets of selected buses to determine the at least one selected bus.

According to an aspect of the invention there is provided a non-transitory computer readable media comprising a set of computational instructions which, when executed, cause a computer to implement the method of the preceding aspect of the invention.

According to an aspect of the invention there is provided a computer program that when run on a processor causes communication between a plurality of buses within a vehicle, comprising: determining at least one selected bus in respect of a received partial networking request; and in dependence on a set of conditions for partial networking being met, providing a network management signal to the at least one selected bus for maintaining nodes on the at least one selected bus in an awake state while allowing at least one node on at least one other bus to enter a sleep state.

According to an aspect of the invention there is provided an apparatus for providing communications between buses within a vehicle, the apparatus comprising a controller, a memory device for storing data and a transceiver for transmitting and receiving signals on a plurality of data buses, wherein the controller is configured to: determine at least one selected bus in respect of a received partial networking request; and in dependence on a set of conditions for partial networking being met, cause network management signals to be provided to the at least one selected bus for maintaining nodes on the at least one selected bus in an awake state while allowing at least one node on at least one other bus to enter a sleep state. The controller may comprise one or more electronic processors.

According to an aspect of the invention there is provided an electronic control unit for a vehicle, the electronic control unit comprising a controller configured to control a system in a vehicle and a transceiver configured to provide communication over a bus, wherein the electronic control unit is configured to: determine that a first function to be performed is performable with partial networking; in dependence of the first function being performable with partial networking, transmit a request for network management to a gateway and transmit a partial networking request to the gateway.

According to an aspect of the invention there is provided an apparatus for providing communications between buses within a vehicle, the apparatus comprising a control means, storage means for storing data and communication means for transmitting and receiving signals on a plurality of data buses, wherein the control means is configured to: determine at least one selected bus in respect of a received partial networking request; and in dependence on a set of conditions for partial networking being met, cause network management signals to be provided to only the at least one selected bus for maintaining nodes on the at least one selected bus in an awake state.

According to an aspect of the invention there is provided an apparatus for providing communications between buses within a vehicle, the apparatus comprising a controller, a memory for storing data and a transceiver for transmitting and receiving signals on a plurality of data buses, wherein the controller is configured to: determine at least one selected bus in respect of a received partial networking request; and in dependence on a set of conditions for partial networking being met, cause network management signals to be provided to only the at least one selected bus for maintaining nodes on the at least one selected bus in an awake state.

According to an aspect of the invention there is provided an electronic control unit for a vehicle, the electronic control unit comprising a controller configured to control a system in a vehicle and a transceiver configured to provide communication over a bus, wherein the electronic control unit is configured to: determine that a first function to be performed is performable with partial networking; in dependence of the first function being performable with partial networking, transmit a request for network management to a gateway.

The apparatus may be for providing a gateway between buses in a network of a vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 11 shows an example of a look-up table 108 stored by the apparatus 101.

DETAILED DESCRIPTION

Figure 1:
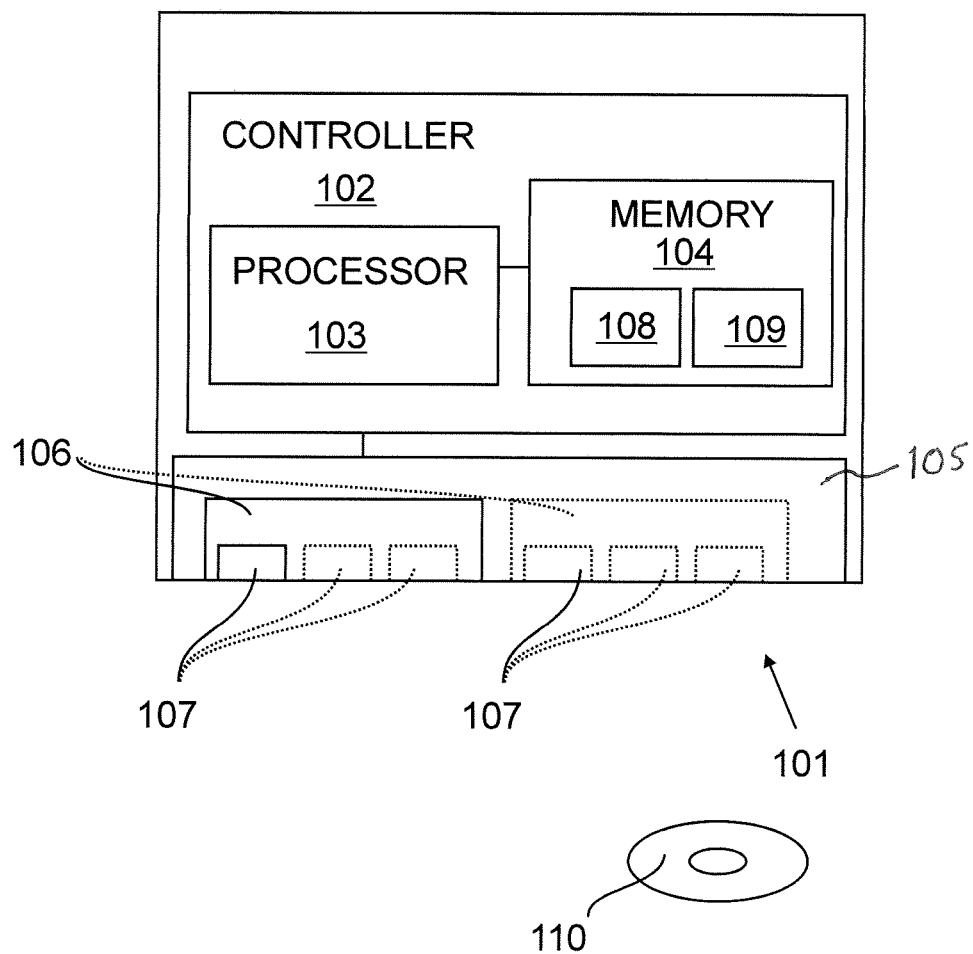
FIG. 1 shows an apparatus 101.

The Figures illustrate an apparatus 101 for providing communications between buses within a vehicle, the apparatus comprising a control means 102, storage means 104 for storing data and communication means 105 for transmitting and receiving signals on a plurality of data buses, wherein the control means 102 is configured to: determine at least one selected bus in respect of a received partial networking request; and in dependence on a set of conditions 701, 702, 703, 704, 705 for partial networking being met, cause network management signals to be provided to the at least one selected bus for maintaining nodes on the at least one selected bus in an awake state while allowing node(s) on at least one other bus to enter a sleep state.

The control means 102 may comprise a controller 102 configured to provide network management, the storage means 104 may comprise at least one memory device 104 and the communication means 105 may comprise a transceiver 106 configured to communicate over a plurality of data buses. The transceiver 106 may be one of several transceivers 106, each configured to communicate over at least one data bus.

An apparatus 101 embodying the present invention is shown in FIG. 1. The apparatus 101 comprises a control means 102 in the form of a controller 102. In the present embodiment the controller 102 comprises a processor 103 and storage means 104 for storing data, such as a look-up table 108, as well as program instructions 109 for causing the processor to operate as described below. The program instructions may be delivered to the storage means via a non-transient computer readable medium 110 containing the program instructions 109. The storage means may comprise a memory device 104. The processor and memory device may be formed as a single component or separate components. Only one processor and one memory device are shown in this example, but it will be appreciated that the controller may comprise several processors and several memory devices.

The apparatus 101 also includes a communication means 105 for transmitting and receiving signals on a plurality of data buses. The control means is configured to determine at least one selected bus in respect of at least one received partial networking request, and in dependence on a set of conditions for partial networking being met, cause network management signals to be provided to the at least one selected bus for maintaining nodes on the at least one selected bus in an awake state while allowing at least one node on at least one other bus to enter a sleep state. The communication means may comprise one or more transceivers 106 each having at least one port 107 configured to be connected to a respective data bus.

The apparatus 101 may be for use as a central gateway (or gateway) in a vehicle, and like central gateways that are known for use in a vehicle, the gateway 101 is configured to provide communication between buses connected to it, so that nodes, such as ECUs (electronic control units), connected to one bus are able to communicate with nodes connected to another bus. The apparatus 101 may be configured to provide communication between data buses of varying types, such as those known for use in a road vehicle, including a CAN (controller area network) bus, a FlexRay bus, a LIN (Local Interconnect Network) bus or an Ethernet bus.

As well as providing communication between buses, the apparatus 101, like existing central gateways, is configured to control the wake-up of nodes on the buses and to allow shutting down of the nodes (that is, allow the nodes to enter a sleep state). When nodes are in a sleep state, they will shut down most of their processing capability to save energy, while maintaining in an awake state some processing logic at the physical layer to monitor the presence of a communication over a bus to which they are connected.

When the apparatus 101 has allowed all connected nodes to be in a sleep state and it receives a network management message from a node via its transceiver 106 indicating that communication is required, in response, it sends a network management signal onto each of the connected buses to wake up all connected nodes. While ever it continues to receive network management messages, which indicate that communication is still required, the apparatus 101 is configured to provide network management signals to connected buses to maintain all connected nodes in an awake state.

In dependence on the apparatus 101 no longer receiving network management messages from any nodes, which indicate that communication is required, the apparatus 101 is configured to provide signals to connected buses indicating to connected nodes that they may re-enter a sleep state.

The apparatus 101 differs from conventional central gateways in that, it is configured to receive partial networking requests and provide communication in respect of those requests. If the apparatus 101 receives a network management message and a partial networking request from the same node, it may allow some buses (that are not required for the communication requested by the partial networking request) to return to the sleep state, while selected buses that are required for the partial networking communication are maintained in an awake state. In this way, the apparatus 101 may enable communication between nodes on different buses, while allowing nodes on buses that are not required for the communication to enter a sleep state.

Figure 2:
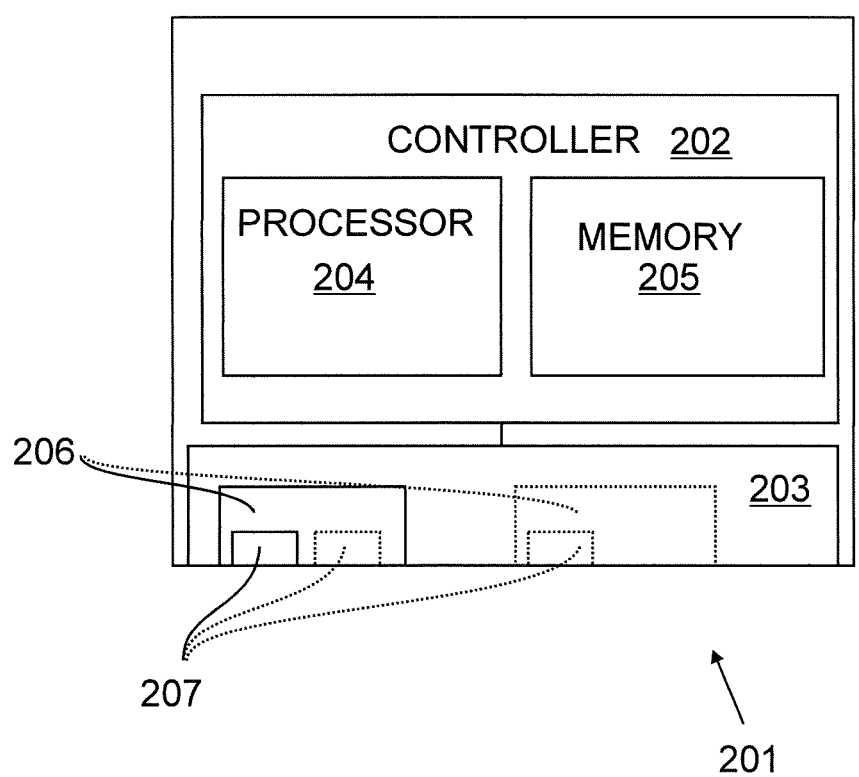
FIG. 2 shows an electronic control unit (ECU) 201 for a vehicle.

An electronic control unit (ECU) 201 for a vehicle is shown in FIG. 2. The electronic control unit comprises a control means 202 for controlling a system in a vehicle and a communication means 203 for communicating over a bus. The control means 202 may comprise a controller 202 that comprises at least one processor 204 and storage means 205. The storage mean 205 may comprise one or more memory devices 205 for storing data and/or program instructions that are run by the processor 204 to cause it to perform its various operations. The communication means 203 may comprise one or more transceivers 206 each having one or more ports 207 for communication over a data bus. In use, the electronic control unit 201 has a port 207 connected to gateway, such as apparatus 101, by a data bus, so that the ECU 201 is able to communicate with other nodes connected to the apparatus 101 via other buses.

Like existing electronic control units, if the ECU 201 wakes up from a sleep state and requires communication with another node, or nodes, on a connected network, it may provide a network management message to the central gateway, so that the central gateway wakes up all other nodes on the network to allow communication to take place. However, the ECU 201 differs from existing electronic control units in that when it wakes up from a sleep state and requires communication with another node, or nodes, on a connected network, it is configured to: determine that a first function to be performed is performable with partial networking; and in dependence on the first function being performable with partial networking, transmit a request for network management to a gateway and transmit a partial networking request to the gateway.

Figure 3:
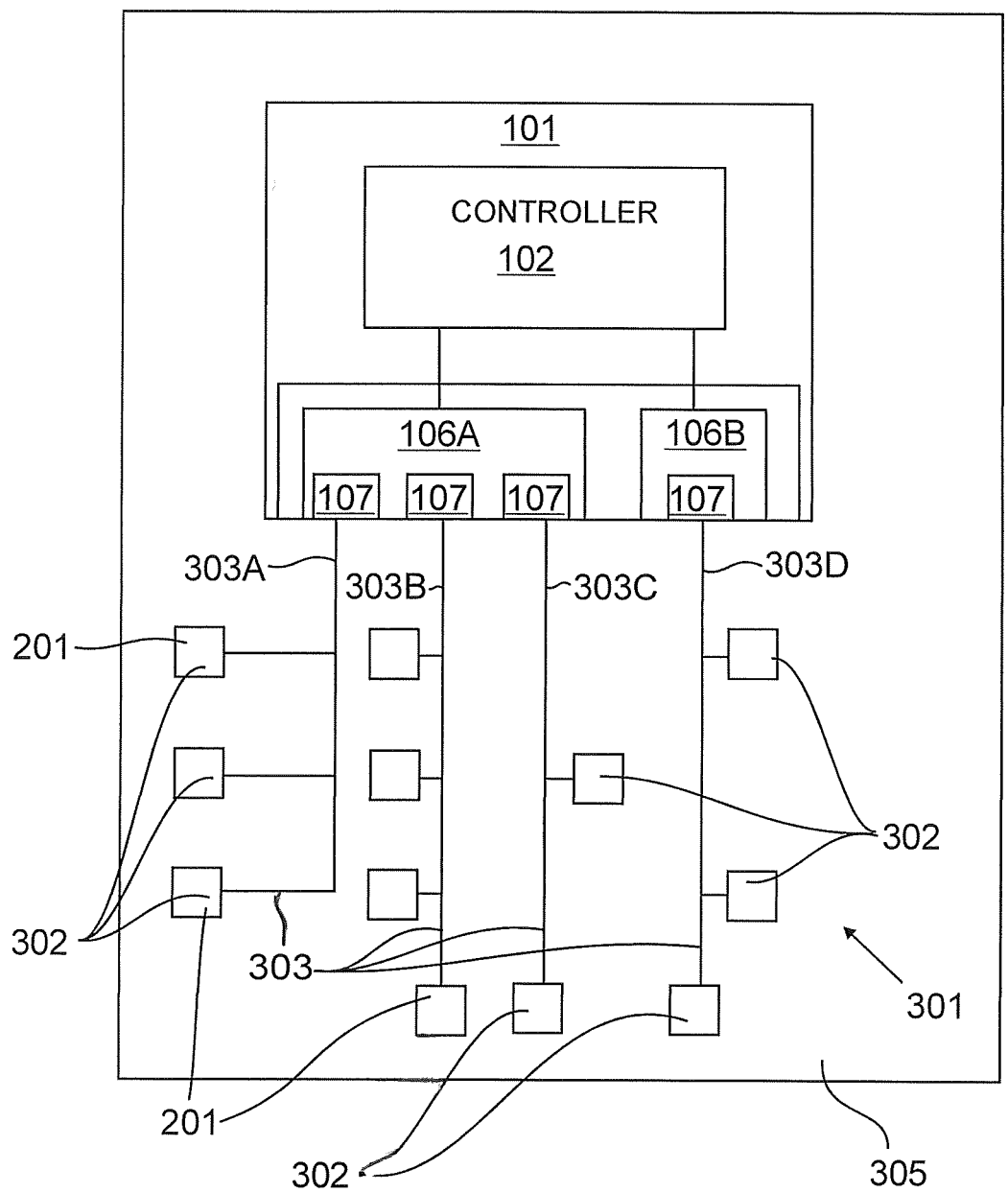
FIG. 3 shows schematically an example of a network 301 within a vehicle 305, which comprises the apparatus 101.

An example of a network 301 within a vehicle 305, which comprises the apparatus 101, is shown schematically in FIG. 3. As well as the apparatus 101, the network 301 comprises several data buses 303 connected to respective ports 107 of the apparatus 101. Each of the buses 303 also has one or more other nodes 302 connected to it, and at least some of the nodes may comprise an electronic control unit 201. In the present example, three of the buses 303A, 303B and 303C are CAN buses and are connected to ports 107 of a first transceiver 106A, while one bus 303D is a FlexRay bus and it is connected to a port 107 of a second transceiver 106B.

If a node 302 on one bus 303 wakes from a sleep mode to perform a function that requires communication over the network 301 it may provide a network management message to the apparatus 101 as discussed above. However, for one or more functions that a node 302 performs, the function may be performed with communication to specific other node(s) and the function may not require nodes on all buses to be in an awake state. For such a function, a node 302 may request partial networking by sending a partial networking request to the apparatus 101. The term "partial networking" refers to a state in which selected data buses are maintained in an awake state for communication over those buses, while one or more other buses are allowed to enter a sleep state. Similarly, a "partial networking request" is a message that provides a request for "partial networking".

Figure 4:
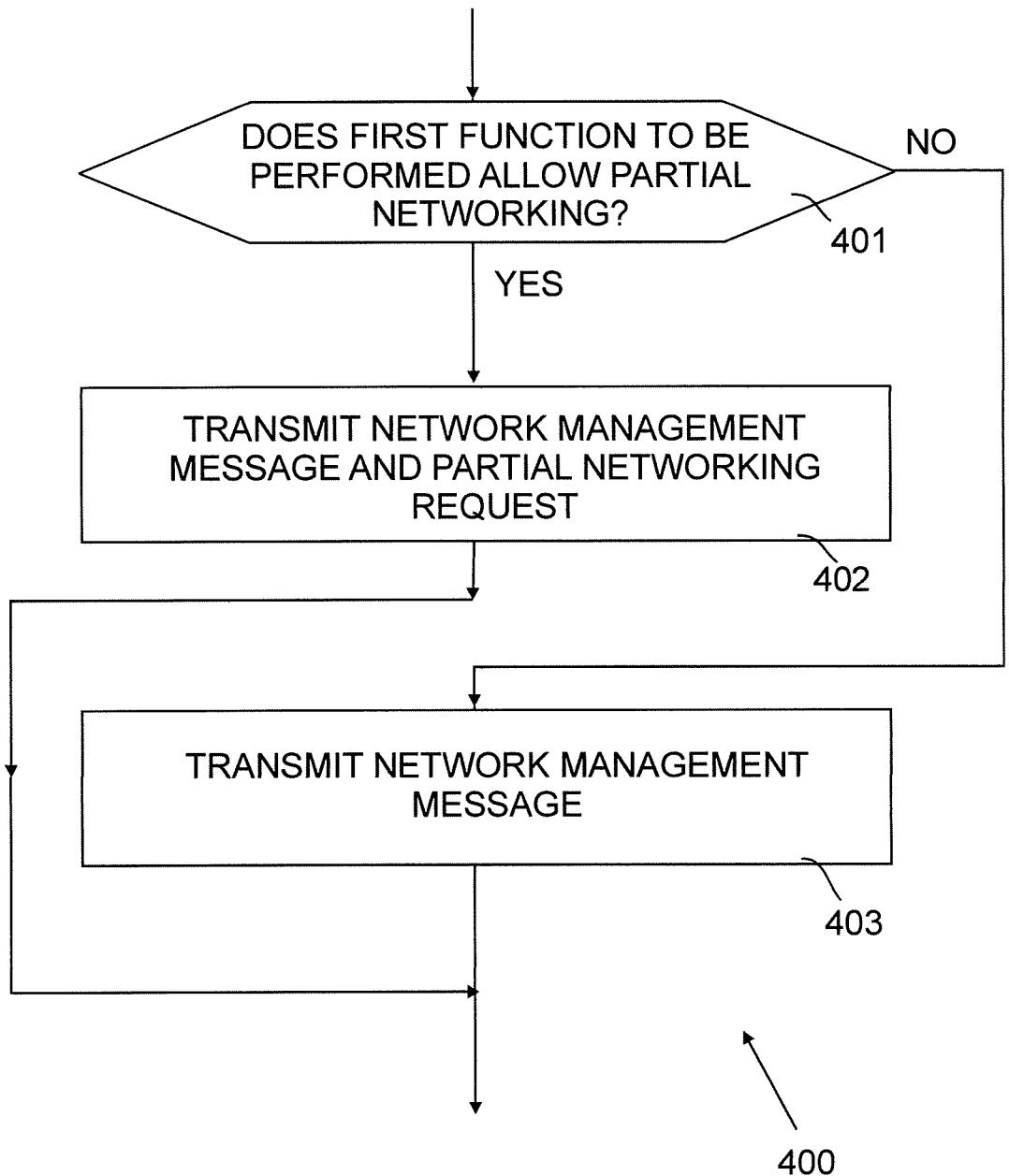
FIG. 4 shows a flow chart of a method 400 performed by a node 302, such as the ECU 201.

A method 400 performed by a node 302, such as the ECU 201 requiring communication over a network, such as network 301, is shown in FIG. 4. Where a node performs several different functions, some of which may be performed with partial networking and some of which require the whole network 301 to remain awake, the node firstly determines at block 401 if the function to be performed may be performed by partial networking. This may be achieved by the node having a stored look-up table that lists functions performed by the node and for each of these functions an associated indicator that indicates that partial networking may be used or may not be used. Thus, when a first function is to be performed by a node, such as ECU 201, the processor 204 accesses data stored in a look-up table in the memory 205 and retrieves the indicator associated with the first function to determine whether partial networking is possible with that function.

When it is determined that partial networking is possible for the first function, the ECU may request partial networking from the gateway 101. This may be achieved by transmitting a network management message to the gateway 101 and transmitting a partial networking request to the gateway at block 402.

When it is determined that partial networking is not available for the first function, the ECU 201 may transmit a network management message to the gateway 101, at block 402, so that the gateway 101 wakes up all connected buses (that is all nodes on all connected buses) and maintains all buses in the awake state so that communication from the requesting node may take place.

An ECU 201 may perform several different functions which only require partial networking, and the partial networking request may comprise a message that identifies the function for which communication is required, to enable the gateway 101 to maintain the required buses in an awake state.

Figure 5:
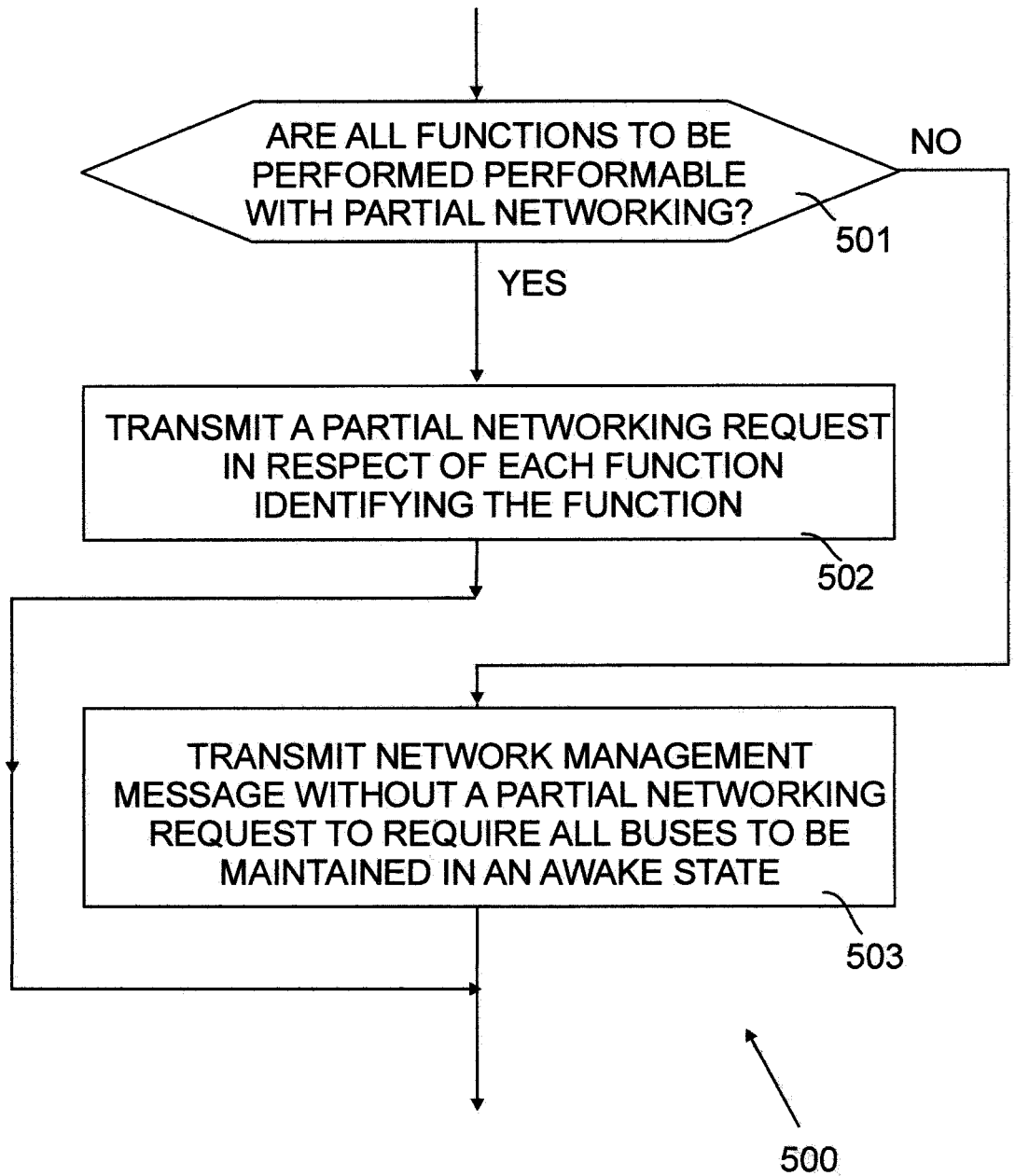
FIG. 5 shows a flow chart of a second method 500 performable by a node 302, such as the ECU 201.

Some nodes 302, such as ECU 201, may be configured to perform two or more different functions where at least one function allows communication by partial networking and at least one function does not allow communication by partial networking (that is, it requires all buses to remain in an awake state). A method 500 performed by such a node is shown in FIG. 5. Firstly at block 501 it is determined whether all functions to be performed are performable with partial networking. The process at block 501 may be performed by retrieving data from a look-up table to determine whether each function to be performed is able to be performed with partial networking.

In dependence on all functions being performable with partial networking, one or more partial networking requests are transmitted identifying each function for which partial networking is requested at block 502. In dependence on a function not being performable with partial networking, a network management message is transmitted without a partial networking request at block 503, to require all buses to be maintained in an awake state.

In an embodiment, a request for partial networking comprises a partial networking signal comprising one or more flags each indicating that partial networking is required, or not required for a predefined function. In an embodiment, the flags are provided in the form of a respective predefined bit corresponding to each function that is performable by partial networking. For example, if partial networking is to be performed in respect of a function, the predefined bit is set to '1' to indicate that partial networking is requested in respect of that function and otherwise it is set to '0'. Thus, partial networking requests comprise a partial networking signal indicating that at least one function requires partial networking. Of course, in an alternative embodiment, a positive flag may be defined as a '0' rather than a '1', while a negative flag indicating that the function is not required may be defined as a '1' rather than a '0'.

In an example, the electronic control unit 201 may be an engine control unit or a powertrain control unit and the first function may comprise communication relating to battery charging. For this function, communication may be safely achieved with partial networking, and by enabling the gateway 101 to allow buses that are not required for communication to enter a sleep mode, energy may be saved. A second function of such an engine control unit may be to provide a periodic transmission of engine data to a communications node for onward transmission of the data. This function may also be safely performed by partial networking. Therefore, when both of these two functions are to be performed, the engine control unit may transmit a network management message followed by one or more requests for partial networking that identifies these two functions to the gateway.

However, such an engine control unit would also require communication when the engine is running. For the engine running function, it is required that all buses remain in an awake state for safety reasons. Therefore, this is an example of a function to be performed that is not performable with partial networking. Consequently, when the engine is running, regardless of whether other functions are to be performed that may be performed with partial networking, the engine control unit transmits a network management message to the gateway 101 without a partial networking request, so that the gateway is caused to keep all buses in an awake state.

A network management message sent by a node 302 includes an identifier that identifies the node to the gateway 101. Similarly, a partial networking request sent by a node 302 includes an identifier that identifies the node to the gateway 101. Thus, the node provides information that enables the gateway 101 to match up received network management messages and partial networking requests.

Figure 6:
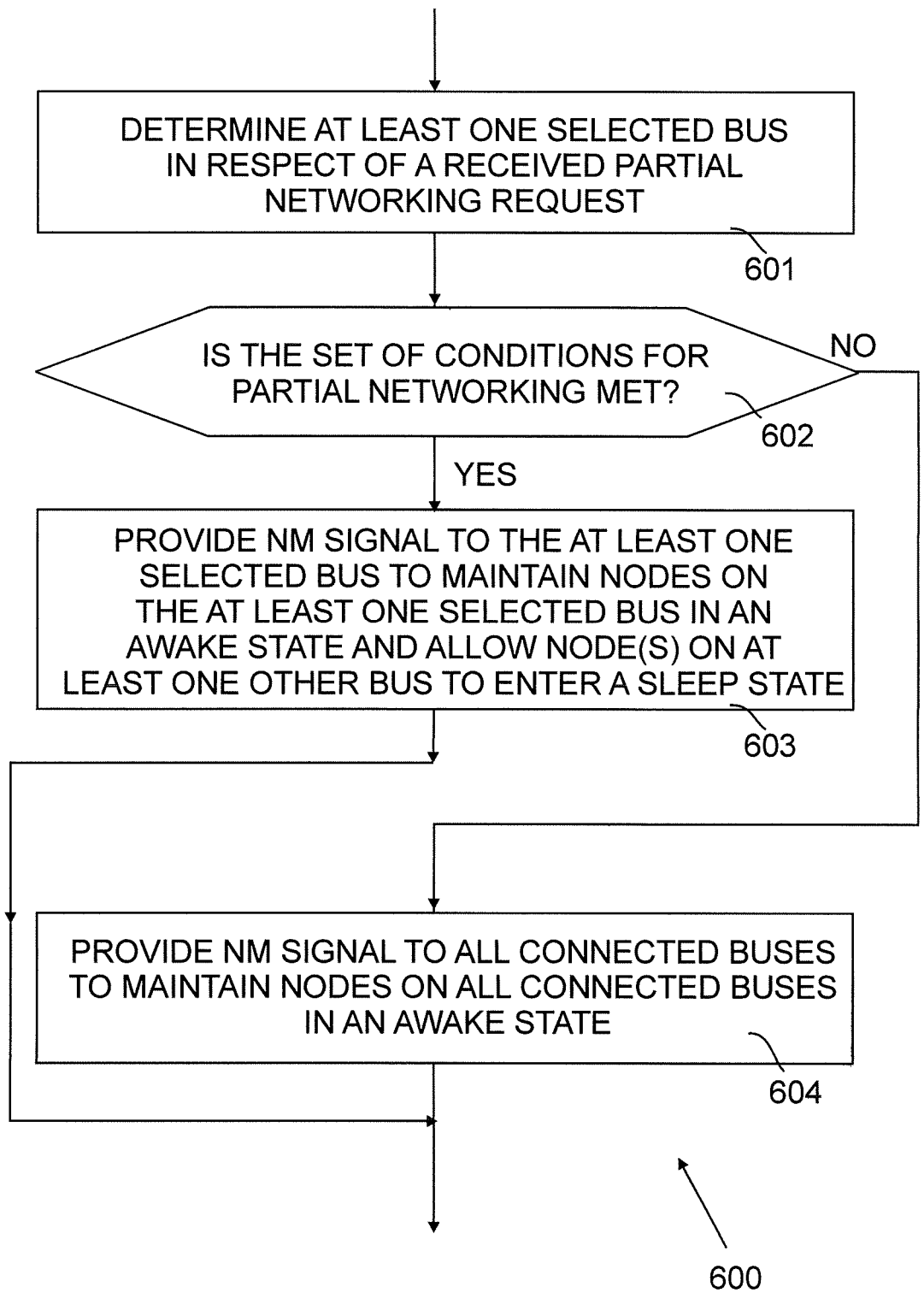
FIG. 6 shows a flow chart of a method 600 which may be performed by the apparatus 101 of FIG. 1.

A method 600 which may be performed by the apparatus (or gateway) 101 is shown in the flow chart of FIG. 6. In response to receiving a partial networking request, at least one selected bus is determined at block 601 in respect of the partial networking request.

In one example, where nodes may perform several different functions that allow partial networking, the partial networking request identifies the function to be performed. The at least one selected bus may be determined by looking up the function in a look-up table (for example look-up table 108, stored in the memory 104 of the apparatus 101) to retrieve selected buses that are associated with that function. (An example of a look-up table is shown in FIG. 11, in which a first node, "NODE #1", is capable of performing three functions "FUNCTION #1", "FUNCTION #2" and "FUNCTION #3" that may be performed by partial networking. A second node, "NODE #2", is capable of performing one function, "FUNCTION #4", using partial networking. "FUNCTION #1" requires buses "BUS #1" and "BUS #2" to be awake while the other functions only require either "BUS #1" or "BUS #2" to be awake.)

In an alternative example, in which nodes may only perform one function that allows partial networking, the partial networking request may identify the node that has sent the request and the at least one selected bus may be determined by looking up the identity of node in a look-up table to retrieve selected buses that are associated with a request from that node.

At block 602 it is determined whether a set of conditions for partial networking are met. In one example, the set of conditions comprises one condition, and the condition is that the vehicle ignition switch is in an "off state", and not an "on state". That is, the engine or motor is not running or being cranked and no user inputs have been received indicating intent to drive the vehicle. Such user inputs may comprise a start button being pressed, for example without the brake pedal being depressed.

In dependence on the set of conditions for partial networking being met at block 602, a network management signal (or "NM signal") is provided to the at least one selected bus for maintaining nodes on the at least one selected bus in an awake state while at least one node on at least one other bus is allowed to enter a sleep state at block 603. For example, the apparatus 101 may provide network management signals to one or more connected data buses (such as buses 303 in FIG. 3) to keep connected nodes (such as nodes 302) in an awake state and it may allow other connected buses (that is, nodes on other connected buses) to enter a sleep state by not continuing to providing network managements signals to those buses.

If it is determined at block 602 that the set of conditions for partial networking are not met then nodes on all connected buses are maintained in an awake state at block 604. For example, the set of conditions for partial networking may comprise the condition that the vehicle ignition switch is in an "off" state, and if the ignition switch is in an "on" state then the set of conditions is not met.

It should be noted that the process at block 602 may be done before the process at block 601, in which case block 601 may only be performed when the conditions for partial networking are found to be met at block 602.

Figure 7:
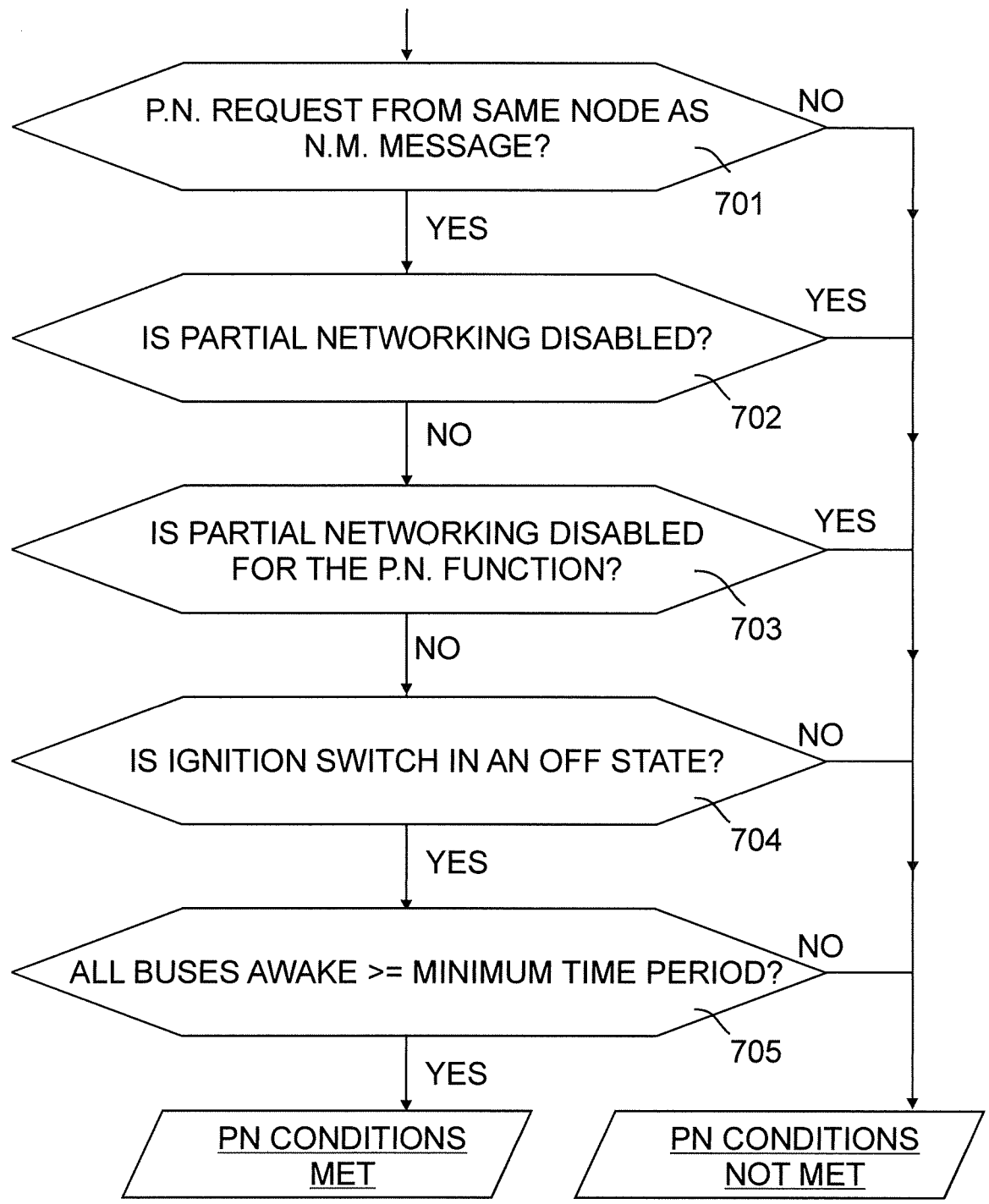
FIG. 7 shows a flow chart of an example method 700 of determining if all of the conditions are met.

The set of conditions to be met at block 602 may comprises a plurality of conditions, and an example method of determining if all of the conditions are met is shown in FIG. 7. In this example, five conditions must be met for partial networking to be enabled. At block 701 it is determined whether the partial networking request (or "P.N. request") is from the same source as a received network management message (or "N.M. message"). If it is not, then the partial networking request may have been received in error and partial networking is not enabled because not all partial networking conditions (or "PN conditions") have been met. That is, the first condition to be met is that the partial networking request is from the same source as a received network management message. To determine the source of the partial networking request, the partial networking request may itself include an identifier identifying the node that transmitted the request.

Alternatively, where partial networking may only be requested by one node in respect of each function for which partial networking may be enabled, the gateway may have a look-up table that shows which node is configured to transmit a partial networking request for each function. In this case, the partial networking request may include a function identifier identifying the function to be performed and the look-up table may be used to retrieve the identity of the node that transmitted the partial networking request.

At block 702 it is determined if partial networking is disabled, for example by manual input to the gateway by an engineer. The condition to be met for partial networking at block 702 is that partial networking is not disabled. Similarly, it is determined at block 703 whether partial networking is disabled for the partial networking function ("P.N. function") identified by the partial networking request. The condition to be met for partial networking at block 703 is that partial networking in respect of that function is not disabled.

At block 704 it is determined if the vehicle ignition switch is in an on state and, if it is, then partial networking is not enabled. Thus, the condition to be met for partial networking is that the vehicle ignition switch is in an off state.

At block 705 it is determined whether all buses have been maintained in an awake state for at least a minimum time period, and if so then partial networking may be enabled. The minimum time period is typically 5 seconds. Thus the condition to be met for partial networking at block 705 is that all buses have been maintained in an awake state for at least a minimum time period. It will be appreciated that in other examples, the number of conditions to be met may be fewer than the five provided in this example or may include additional conditions.

Figure 8:
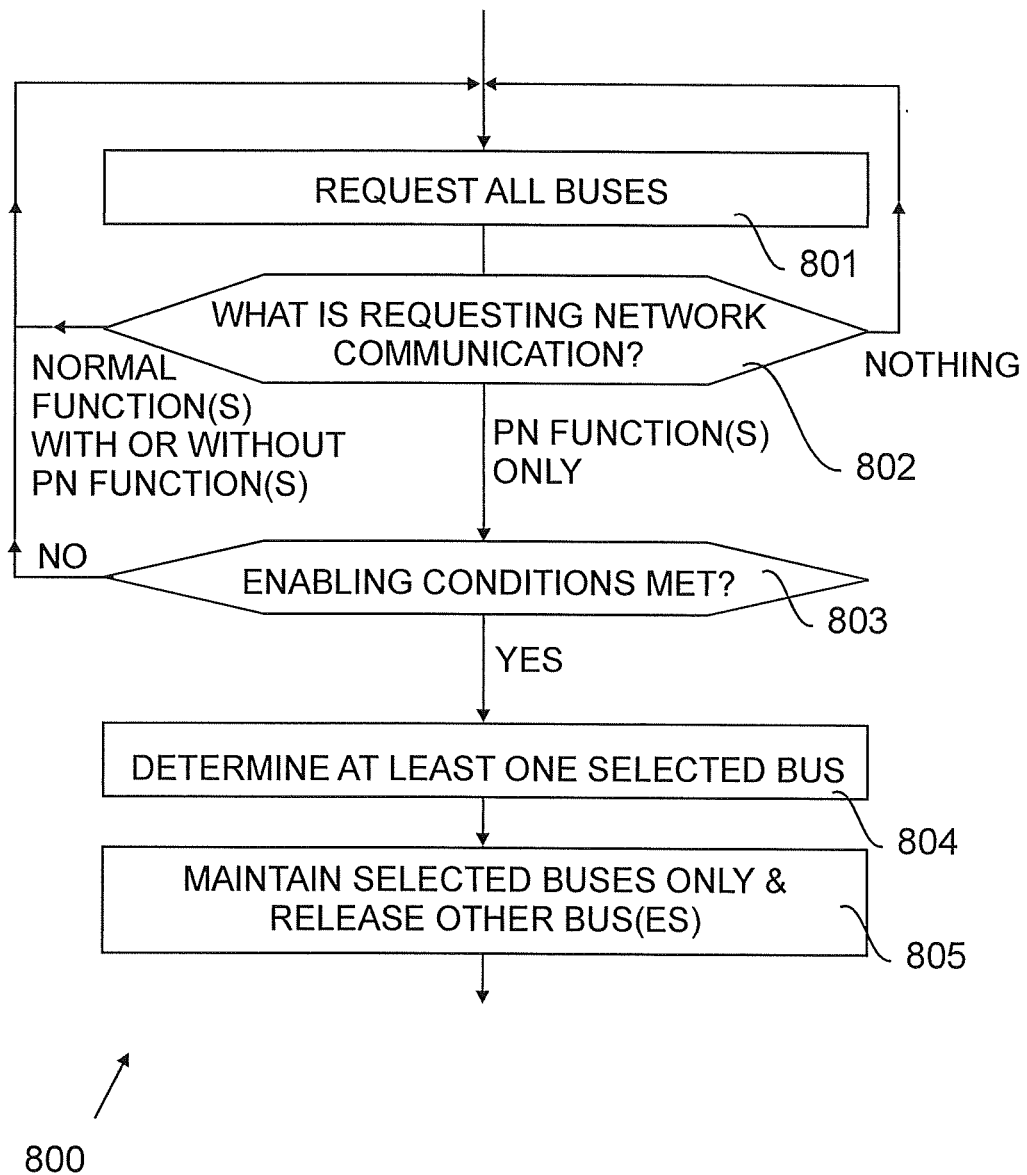
FIG. 8 shows a flow chart of a further example method 800 that may be performed by the apparatus 101.

A further example method 800 that may be performed by the apparatus (or gateway) 101 is shown in the flow chart of FIG. 8. The method 800 is performed when the apparatus (or gateway) 101 has allowed nodes on connected buses to enter a sleep state but network communication is required. At block 801 network management signals are provided to all buses connected to the apparatus 101 to indicate that all nodes on the connected buses should be put in an awake state.

At block 802 it is then determined what is requesting the network communication. If it is determined at block 802 that nothing is requesting network communication then the process at blocks 801 and 802 are repeated.

If it is determined at block 802 that a normal function (that is, one that does not enable partial networking) requires network communication, then all buses are maintained in an awake state at block 801 and the process returns to block 802. An indication that network communication is required for a normal function would be the receipt of a network management message from a node without a partial networking request from that same node. It may be noted that even if a partial networking request is received from another node, if a request for network communication is received for a non-partial network function (a "normal function") then all buses are maintained in an awake state at block 801.

Alternatively, if it is determined at block 802 that one or more requests for network communication have been received in respect of a function for which partial networking is possible, but no requests in respect of non-partial network functions have been received, block 803 is performed. That is, if it is determined at block 802 that one or more partial networking requests have been received then block 803 is performed, in which it is determined whether a set of conditions for partial networking are met. The conditions may be some or all of the conditions identified above in respect of FIG. 7. If not all of the conditions in the set are met, then the process returns to block 801 where all buses are maintained in an awake state before block 802 is repeated.

Alternatively, if it is determined at block 803 that all conditions required for partial networking are met, then at block 804 at least one selected bus is determined in respect of the function, or functions, for which partial networking requests have been received. That is, one or more selected buses are identified as being required to provide communication relating to the received partial networking request(s). Only those buses that are required to provide the partial networking communication for the function, or functions, are maintained in an awake state at block 805 while one or more other buses are allowed to enter a sleep state. That is, network management signals are provided to only select buses that are required to provide communication between nodes on these buses for the partial networking function or functions. The network management signals are not provided to the other buses, thereby allowing the nodes on these other buses to enter a sleep mode.

Figure 9:
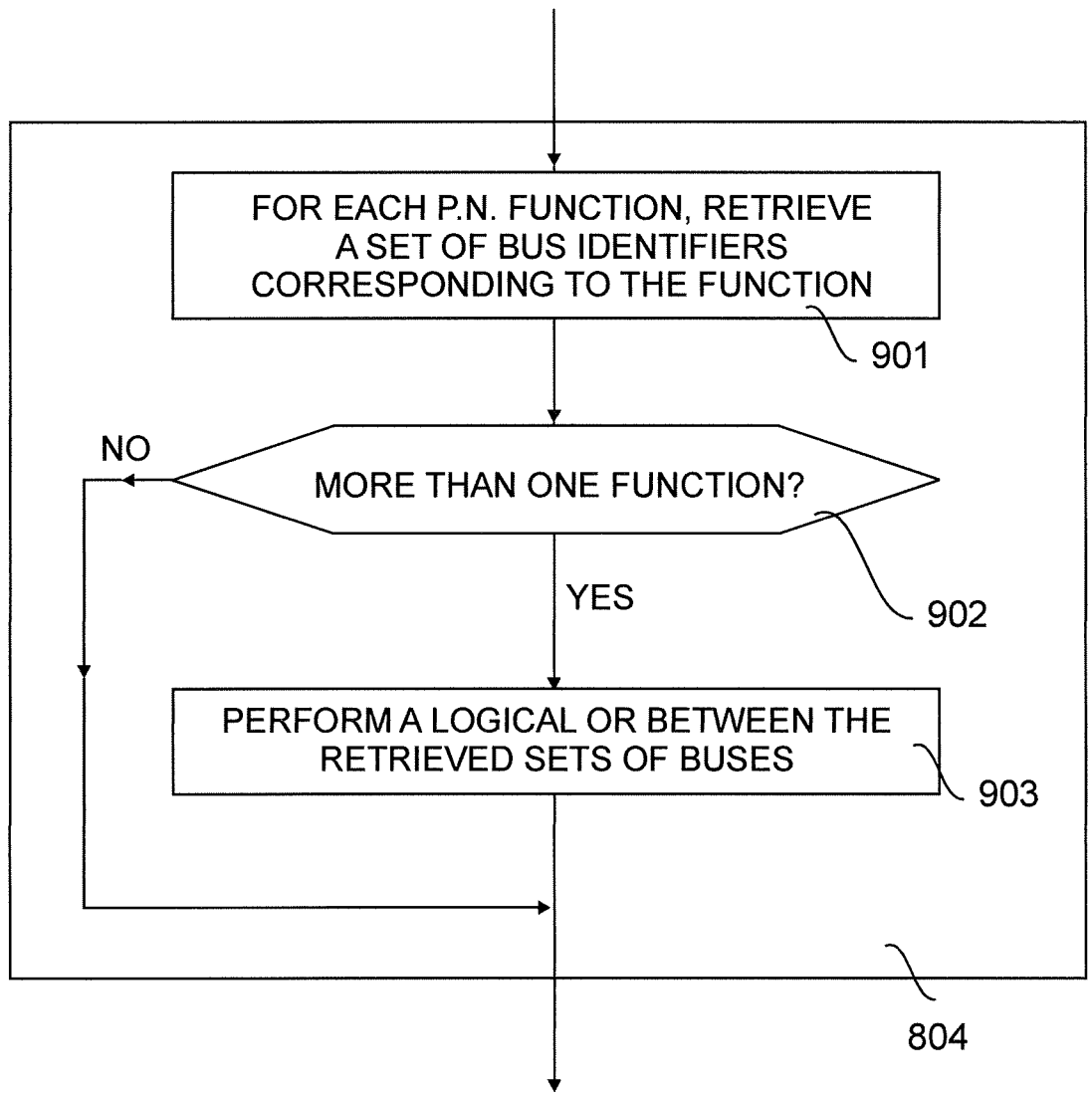
FIG. 9 shows a flow chart of an example of the process of block 804 of FIG. 8.

An example of the process of block 804 is shown in further detail in FIG. 9. At block 901 for each function identified from the received partial networking request(s), a look-up table (for example, look-up table 108 stored in memory 104 of apparatus 101) is accessed to retrieve a set of bus identifiers corresponding to that function. If it is determined that communication is required for more than one partial networking function, at block 902, a logical "OR" may be performed on the sets of buses at block 903 to determine the selected buses.

For example it may be determined that a first set of selected buses are required to provide requested partial networking for a first partial networking request, and a second set of selected buses are required to provide requested partial networking for a second partial networking request. A logical OR is then performed on the first set and second set to determine the at least one selected bus to which network management signals are provided to keep those buses in an awake state. For example, if the first set comprised of buses 303A and 303C (in FIG. 3) and the second set comprised of bus 303A and 303D, then the logical OR would result in buses 303A, 303C and 303D being maintained in an awake state while bus 303B is allowed to enter a sleep state.

Figure 10:
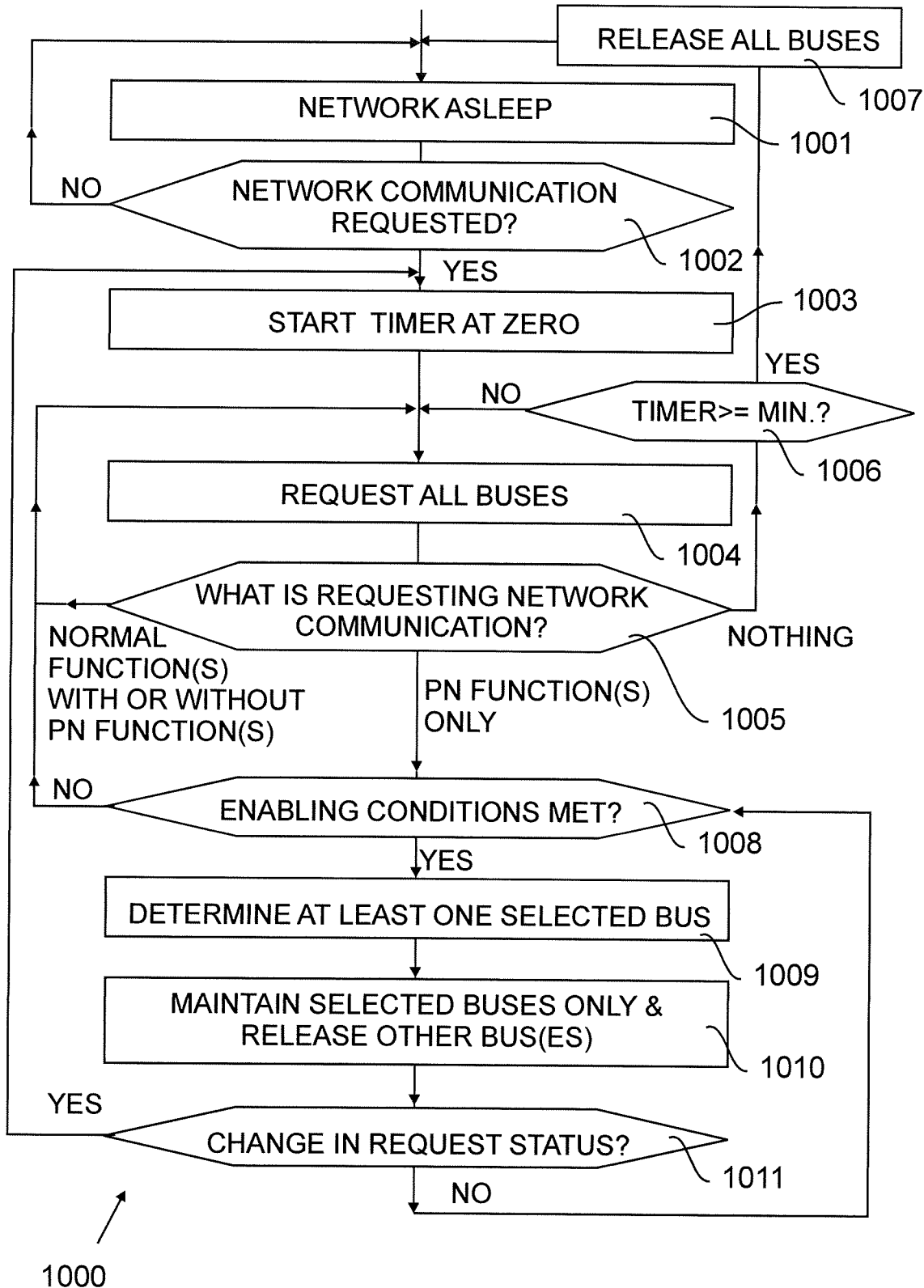
FIG. 10 shows a flow chart of a further example method 1000 that may be performed by the apparatus (or gateway) 101.

A further example method 1000 that may be performed by the apparatus (or gateway) 101 is shown in the flow chart of FIG. 10. As previously mentioned, the apparatus 101 is configured to provide network management signals to connected data buses (such as buses 303 in FIG. 3) to keep connected nodes (such as nodes 302) in an awake state. It is also configured to allow connected buses (that is nodes on connected buses) to enter a sleep state when the awake state is not required, such as at block 1001 of FIG. 10. While allowing the nodes to enter a sleep state at block 1001, the apparatus 101 may continuously, or repeatedly, determine whether any part of the network 301 requests network communication at block 1002. Such a request may come from a module in the apparatus 101 itself, or the request may be provided to the apparatus 101 as a network management message received from a node (such as a node 302 of FIG. 3) over a bus (such as a bus 303).

When it is determined at block 1002 that there is a request for network communication, a timer is started from zero at block 1003 and at block 1004 network management signals are provided to all buses connected to the apparatus 101 to indicate that nodes on the connected buses should be put in an awake state.

At block 1005 it is then determined what is requesting the network communication. If it is determined that nothing is requesting network communication, it is determined at block 1006 whether the timer has been running for at least a preset minimum time period (which is typically five seconds) and if not then block 1004 is performed again to maintain the buses in an awake state. Then, it is again determined at block 1005 what is requesting the network. Blocks 1006, 1004 and 1005 are repeatedly repeated if nothing is requesting the network until it is determined at block 1006 that the timer has been running for at least the preset minimum time period. At which time, all buses are released at block 1007. That is, network management signals previously provided to all buses are stopped at block 1007 to allow all connected nodes to enter a sleep state. The process then returns to block 1001 and block 1002 to await further network requests.

Alternatively, if it is determined at block 1005 that a normal function, that does not enable partial networking, requires network communication, then all buses are maintained in an awake state at block 1004 and the process returns to block 1005. An indication that network communication is required for a normal function would be the receipt of a network management message from a node without a partial networking request from that same node. It may be noted that even if a partial networking request is received from another node, if a request for network communication is received for a non-partial network function (a "normal function") then all buses are maintained in an awake state at block 1004.

Alternatively, if it is determined at block 1005 that the only request, or requests, for network communication that has been received is in respect of a function for which partial networking is possible, block 1008 is performed. That is, if it is determined at block 1005 that one or more requests for network communication have been received but all of them are in respect of functions for which partial networking is possible then block 1008 is performed. At block 1008 it is determined whether a set of conditions for partial networking are met. The conditions may be some or all of the conditions identified above in respect of FIG. 7. If not all of the conditions are met, then the process returns to block 1004 where all buses are maintained in an awake state before block 1005 is repeated.

Alternatively, if it is determined at block 1008 that all conditions required for partial networking are met, then at block 1009 at least one selected bus is determined in respect of the partial networking function, or functions, for which partial networking requests have been received. The process at block 1009 may be the same as the process of block 804 described above in respect of FIG. 9.

Only those buses that are required to provide the partial networking communication for the function, or functions, are maintained in an awake state at block 1010 while one or more other buses are allowed to enter a sleep state. That is, network management signals are provided to only the select buses that are required to provide communication between nodes on those buses for the partial networking function or functions. Signals are provided to the remaining buses allow the nodes on those buses to enter a sleep mode.

At block 1011 it is determined if there is any change to the status of requests for network communication, and, if not, then block 1008 is repeated. A change may be due to the receipt of a new network management message in respect of a new request for communication over the network (with or without a partial networking request). Alternatively the change may be an indication from a node that communication over the network for a particular function is no longer required. In either case, if it is determined at block 1011 that there has been a change in request status, then the process returns to block 1003 where the timer is reset before network management signals are provided to all buses to bring the attached nodes to an awake state at block 1004. Thus, whenever a new request is received or when a function requiring partial networking is finished, all buses are brought to an awake state. The process then returns to block 1005.

When there are no longer any functions being performed that require communication over the network, the process loops around blocks 1006, 1004 and 1005 until the timer goes past the preset minimum time period and the buses are allowed to enter the sleep state at block 1007.

For purposes of this disclosure, it is to be understood that the controller(s), ECUs and gateways described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

The blocks illustrated in the FIGS. 4 to 10 may represent steps in a method and/or sections of code in the computer program 109. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for providing communications between buses within a vehicle, the apparatus comprising a controller, at least one memory device for storing data and at least one transceiver for transmitting and receiving signals on a plurality of data buses, wherein the controller is configured to:
   receive a partial networking request;
   select at least one of the plurality of data buses based on the received partial networking request; and
   based on a set of conditions for partial networking being met, cause network management signals to be provided to the at least one selected bus for maintaining nodes on the at least one selected bus in an awake state while allowing at least one node on at least one other bus to enter a sleep state.

2. An apparatus according to claim 1, wherein the controller is further configured to:
   determine if a network management message has been received without a partial networking request; and
   based on receiving a network management message without a partial networking request, cause network management signals to be provided for maintaining at least one node on all connected buses in an awake state.

3. An apparatus according to claim 1, wherein the controller is further configured to:
   select a set of buses from the plurality of data buses that are required to provide requested partial networking for each one of a plurality of partial networking requests; and
   perform a logical OR on the sets of selected buses to determine the at least one selected bus.

4. An apparatus according to claim 1, wherein the set of conditions comprises a plurality of conditions, and the controller is further configured to determine if all of the conditions are met.

5. An apparatus according to claim 1, wherein the set of conditions for partial networking is independent of any current request for networking without partial networking.

6. An apparatus according to claim 1, wherein the set of conditions for partial networking comprises a vehicle ignition switch being in an off state.

7. An apparatus according to claim 1, wherein the controller is further configured to determine if a partial networking request received from a node is valid by determining if a network management message has also been received from the node.

8. An apparatus according to claim 1, wherein the controller is further configured to:
   provide network management signals to maintain in an awake state, for a predefined period of time, nodes on the at least one selected bus and on said at least one other bus; and subsequently allow at least one node on said at least one other bus to enter a sleep state, while continuing to provide network management signals to the at least one selected bus for maintaining nodes on the at least one selected bus in an awake state.

9. An apparatus according to claim 1, wherein the controller is further configured to:
receive a partial networking request identifying a function; and
determine the at least one selected bus by retrieving from the at least one memory device at least one bus identifier corresponding to the function.

10. An apparatus according to claim 1, wherein the controller is further configured to:
receive a first partial networking request identifying a first function and a second partial networking request identifying a second function;
retrieve at least one first bus identifier corresponding to the first function and retrieve at least one second bus identifier corresponding to the second function; and
perform a logical OR on the first and second bus identifiers to determine the at least one selected bus for the requested partial networking.

11. An apparatus according to claim 1, wherein the controller is further configured to:
monitor changes in status of requests for networking; and
based on a change in status of requests for networking, provide network management signals to all buses for putting nodes in an awake state.

12. An apparatus according to claim 1, wherein the apparatus comprises a central gateway.

13. An electronic control unit for a vehicle, the electronic control unit comprising a controller for controlling a system in a vehicle and at least one transceiver for communicating over a bus, wherein the electronic control unit is configured to:
determine that a first function to be performed is performable with partial networking; and
based on the first function being performable with partial networking, transmit a network management message and transmit a partial networking request, wherein the electronic control unit is an engine control unit or a powertrain control unit and the first function comprises communication relating to battery charging.

14. An electronic control unit according to claim 13, wherein the partial networking request comprises a message that identifies the first function.

15. An electronic control unit according to claim 13 wherein the electronic control unit is further configured to:
determine whether both the first function to be performed and a second function to be performed are performable with partial networking; and
based on both the first function and the second function being performable with partial networking, transmit one or more partial networking requests identifying the first function and the second function.

16. An electronic control unit according to claim 13, wherein the electronic control unit is further configured to:
determine that another function to be performed is not performable with partial networking; and
based on the other function not being performable with partial networking, transmit a network management message without a partial networking request, to require all buses to be maintained in an awake state.

17. A communication network for a vehicle, the communication network comprising an apparatus as claimed in claim 13 operatively connected to a plurality of nodes via a plurality of buses.

18. A vehicle having the communication network of claim 17.

19. A non-transitory computer readable media comprising a set of computer readable instructions that, when executed by a processor, cause performance of:
selecting at least one of a plurality of data buses based on a received partial networking request; and
based on a set of conditions for partial networking being met, communicating a network management signal to the at least one selected bus for maintaining nodes on the at least one selected bus in an awake state while allowing node(s) on at least one other bus to enter a sleep state.

* * * * *